United States Patent Office 3,660,511
Patented May 2, 1972

---

3,660,511
FLUORODIAZADIENES AND PROCESS OF MAKING
Paul H. Ogden, Oakdale Township, Minn., assignor to Minnesota Mining and Manufacturing Company, St. Paul, Minn.
No Drawing. Continuation-in-part of application Ser. No. 577,192, Sept. 6, 1966. This application Apr. 3, 1967, Ser. No. 627,607
Int. Cl. C07c *119/00*
U.S. Cl. 260—566 R                14 Claims

ABSTRACT OF THE DISCLOSURE

Trifluoromethylimino terminated compounds useful as dehydrating agents, crosslinking agents and ultraviolet light filters and process for making by isomerizing perfluoro-α,ω-bisazomethines in the presence of ionic fluoride.

CROSS REFERENCES

This application is a continuation-in-part of my earlier filed application Ser. No. 577,192, now abandoned.

My copending application, U.S. patent application Ser. No. 562,540 filed July 5, 1966 now Pat. No. 3,374,581, teaches starting materials useful in the practice of this invention.

BACKGROUND

Partially fluorinated carbodiimides, e.g.

$$CF_3-N=C=N-CH_3$$

have been reported previously, see S. P. Markarov et al., Dokl. Akad. SSSR, 142, 576–9 (1962), but the process known for preparing such compounds is not applicable to completely fluorinated materials. The above cited reference discloses the preparation of $CF_3-N=C=N-CH_3$ by means of thermal decomposition of a compound having the structure $$\begin{array}{c} CH_3N-C-C=NCH_3 \\ | \quad | \\ O-NCF_3 \end{array}$$

This process as well as its product are substantially dissimilar to the present invention.

Few methods of preparing perfluoroazaalkenes have been reported in the chemical literature. Those processes which have been reported, such as the pyrolysis of polyfluorooxazetidenes (R. N. Haszeldine et al., J. Chem. Soc., 1351 (1961) and references therein) or perfluoro tert-amines (W. H. Pearlson and L. J. Hals, U.S. Pat. 2,643,267), are applicable only to the preparation of monoazaalkenes.

One reported preparation of difunctional perfluoroazaalkenes involves the photolysis of tetrafluoro-2,3-diazabutadiene, $CF_2=N-N=CF_2$, in the presence of fluoro-olefins (P. H. Ogden, U.S. patent application Ser. No. 562,540). Azaalkenes prepared by this process possess the general structure $CF_2=N-R_f-N=CF_2$, where $R_f$ is a perfluoroalkylene group.

Perfluoroazines, characterized by the functional group —CF=N—N=CF—, have been reported (W. F. Chambers, U.S. Pat. 3,117,996). Perfluoroimines, characterized by the functional group —C=NF (R. A. Mitsch, J. Am. Chem. Soc., 87, 328 (1965)), have also been reported. Each of these classes of compounds possesses properties characteristic of their functional groups which are different from the properties possessed by the novel compounds of this invention. For instance, the prior art azines are photolytically unstable and may be used as polymerization initiators because of the —CF=N—N=CF— moiety while the fluoroimines of the prior art possess strong oxidizing properties, characteristic of the N—F bond.

Surprisingly and unexpectedly, it has been found that compounds of this invention which contain the functional group

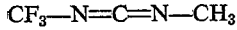

isomerize readily in the presence of ionic fluoride to produce compounds having the characteristic substituent group,

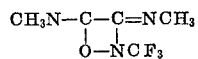

This novel process has led to a route to certain novel compounds of this invention from the novel difunctional starting materials described by the inventor in the previously cited copending application. No route previously known to the inventor teaches the novel difunctional compounds of this invention.

SUMMARY

It has now been discovered that trifluoromethylimino terminated compounds of the general formulas:

(1) $C_3-N=C=N-CF_3$
(2) $CF_3-N=CX-CY=N-CF_3$
(3) $CF_3-N=CF-CXF-N=CF_2$
(4) $CF_3-N=CF(CF_2)_n CF=N-CF_3$
(5) $CF_3-N=CF(CF_2CFCl)_m CF=N-CF_3$ where, in each formula, X and Y are fluorine or a lower perfluoroalkyl group, $n$ is an integer of from 0 through 20 inclusive, and $m$ is an integer from 0 through 10 inclusive, are prepared by contacting under anhydrous conditions, with ionic fluoride, perfluorodiazadienes of the formulas:

(6) $CF_2=N-CF_2-N=CF_2$
(7) $CF_2=N-CFXCFY-N=CF_2$
(8) $CF_2=N-(CF_2)_n-N=CF_2$
(9) $CF_2=N-(CF_2CFCl)_m-N=CF_2$ where X, Y and $n$ and $m$ are as defined above.

The ionic fluoride may be supplied by the compounds of Formulas 6 through 9 themselves (when e.g. water is present) or by adding a suitable source of ionic fluoride, preferably cesium fluoride. The desired trifluoromethylimino terminated products of Formulas 1 through 5 are then formed as a result of isomerization induced by ionic fluoride.

The isomerization reaction of this invention requires a condensed phase, that is, either a solid ionic fluoride phase with the azomethine present as vapor or liquid, or a homogeneous liquid phase containing fluoride ion in solution. The term "ionic fluoride" therefore includes both solid salt-like structures and free fluoride ion. Compounds in which the fluorine appears as a stable complex, e.g. ferric fluoride, are generally not suitable. Compounds which readily produce fluoride ion upon hydrolysis by adventitious moisture such as SiF$_4$ can be used as catalysts, but the resulting low fluoride ion concentration results in slow and incomplete isomerization. The preferred isomerization catalysts are the alkali metal fluorides, particularly cesium fluoride. The total amount of fluoride present in a reaction zone does not control the reaction. The rate of reaction depends upon the amount of surface available where a solid phase is present. In the case of the homogeneous reaction the rate is apparently proportional to the concentration of fluoride ion in the liquid phase.

The azomethine starting material may be present as liquid or vapor or may be in solution, preferably in an inert organic solvent, e.g. a solvent which does not itself appreciably react with the azomethine under the conditions of the reaction and preferably does not react with the desired products. Such solvents are free of active Zerewitinoff hydrogen and dissolve, under the reaction conditions, at least 1% by weight of the azomethine. Such solvents include halocarbons, such as CFCl$_3$, HCF$_2$Cl, oxygenated organic compounds, such as acetone, ethyl acetate, and the like.

The reaction is preferably carried out at room temperature, but it will proceed within a temperature range of 0° C. to 150° C. The reaction rate is increased when the reaction temperature is increased for a given ionic fluoride concentration.

The reaction which takes place is an isomerization which may be represented by the following equation:

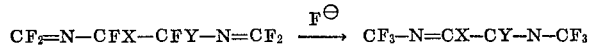

where X and Y are each as defined above. The rate of isomerization varies according to the source of ionic fluoirde used; thus, in the presence of cesium fluoride, perfluoro(3-methyl-2,5-diazahexa-1,5-diene), $$CF_2=N-CF_2CF(CF_3)-N=CF_2$$

is completely converted into perfluoro(3-methyl-2,5-diazahexa - 2,4 - diene), CF$_3$—N=CF—C—(CF$_3$)=N—CF$_3$, while, in the presence of traces of fluoride ion from silicon tetrafluoride or hydrogen fluoride obtained, for example, through the admission of traces of water into the apparatus, CF$_2$=N—CF$_2$—CF(CF$_3$)—N=CF$_2$ is converted only to the half isomerized perfluoro(3-methyl-2,5-diazahexa - 1,4 - diene), CF$_3$—N=CF—CF(CF$_3$)—N=CF$_2$, after sixteen days.

Usually conversion from the perfluoro - α,ω - bisazomethine is complete in the presence of cesium fluoride and no purification of products is necessary; however, the boiling points of starting material and isomerized product are usually sufficiently different to enable separation to be accomplished if necessary, e.g.

boils at 43° C. whereas its isomer CF$_3$—N=C=N—CF$_3$ boils at 7° C.

The starting compounds of Formulas 6 through 9 are prepared by the ultraviolet photolysis of a mixture of perfluoro-2,3-diazabuta-1,3-diene with a fluorinated olefin at a temperature in the range of —140° to 100° C., as described in my copending U.S. patent application No. 562,540 now Pat. No. 3,374,581.

The compound of Formula 1, which is herein termed bis(trifluoromethyl) carbodiimide, and the compounds of Formulas 2 through 5, which are herein termed perfluorodiazadienes, are useful dehydrating agents as exemplified by their use in the preparation of esters from acids and alcohols. The compounds abstract water from the reacting species and are converted into ureas, oxamides or α-keto-amides. They are thus useful in that they can be used in a fluorinated system with which non-fluorinated dehydrating agents are incompatible. Especially useful in this respect is bis(trifluoromethyl) carbodiimide.

In general, the compounds of Formula 2 are useful as ultraviolet light filters in the range from about 180 to 200 mµ.

The compounds of Formulas 1 through 5 are useful as cross-linking agents. Thus, such products are admixed with prepolymers which contain active hydrogen atoms, such as polyalcohols, including polyvinyl alcohol, or polyamides, including polycaprolactam, and the like under a dry atmosphere, then treated with water to produce diester or diamide crosslinks.

Compounds of Formulas 4 and 5 are useful for the preparation of dicarboxylic acids and amides.

Compounds of Formulas 1 and 2 are useful intermediates for the manufacture of fluorinated amides as taught, for example, in my copending U.S. patent application Ser. No. 627,609 filed on even date herewith now Pat. No. 3,538,157.

The carbodiimide of Formula 1 is a volatile liquid which boils at 7° C. It can be separated from its starting materials, solvent and by-products by conventional methods such as vapor phase chromatography, fractional distillation-condensation or fractional distillation. It is readily hydrolyzed by water, and care must be taken to exclude traces of moisture from the apparatus in which it is handled.

The perfluorodiazadienes of Formulas 2 and 3, range from colorless liquids to white solids, the higher molecular weight compounds generally having the higher melting points. They are readily hydrolyzed and care must be taken when handling them to exclude moisture from the apparatus which is used.

EXAMPLES

The following examples more particularly illustrate the invention:

EXAMPLE 1

(A) Preparation of the starting material

Perfluoro - 2,3-diazabuta-1,3-diene,  (30 millimoles) is condensed at —196° C. under vacuum into a silica tube of 200 ml. capacity, fitted with a polytetrafluoroethylene valve. The tube is sealed, and, after warming to room temperature, the contents are irradiated for 16 hours with ultraviolet light from a 1000 watt, air cooled ultraviolet lamp (an electric lamp producing strong ultraviolet light in the region of 1800–4000 A. and available from the General Electric Company under the trade designation BH6 is suitable).

The contents of the tube are then pumped under vacuum into a trap cooled to —196° C. and subsequently characterized, by infrared, F$^{19}$ N.M.R. and mass spectra, together with elemental analysis, as perfluoro-2,4-diazapenta-1,4-diene, CF$_2$=N—CF$_2$—N=CF$_2$ (20 millimoles 100% conversion) and nitrogen.

(B) Preparation of bistrifluoromethyl carbodiimide

Ten millimoles of perfluoro-2,4-diazapenta-1,4-diene, CF$_2$=N—CF$_2$—N=CF$_2$, are condensed into a tube containing 0.1 g. of dried cesium fluoride. After remaining for two hours at room temperature, the volatile material is removed from the tube and separated into its components by vapor phase chromatography. The major component is found to be bis(trifluoromethyl) carbodiimide having the structural formula CF$_3$—N=C=N—CF$_3$, the retention time of which, relative to chlorotrifluoromethane, is 21.0. The yield approaches theoretical with recovery of product (about 8 millimoles) being in excess of 80 percent.

The product, which boils at about 7° C. under normal pressures, has characteristic spectra. Thus, it shows a strong infrared absorption at 2210 cm.$^{-1}$ corresponding to the N=C=N group, a single peak in the F$^{19}$ N.M.R. spectra at 50.2φ corresponding to the CF$_3$ group, and its molecular weight is found to be 180 (C$_3$N$_2$F$_6$ requires 178) when determined by effusion techniques using a mass spectrometer as an effusiometer. Analysis, calculated for $C_3F_6N_2$: F, 64.0; found: F, 63.5.

EXAMPLE 2

Perfluoro 2,5-diazahexa-1,5-diene, $$CF_2=N-CF_2-CF_2-N=CF_2$$

(0.1 g.) is condensed in vacuum into a Pyrex tube containing cesium fluoride (0.1 g.) and maintained at room temperature for twelve hours. Perfluoro 2,5-diazahexa-2,4-diene, $CF_3-N=CF-CF=N-CF_3$ is obtained in quantitative yield and characterized by its $F^{19}$ N.M.R., infrared and mass spectra together with molecular weight.

Its $F^{19}$ N.M.R. spectrum indicates two different types of fluorine atoms in the ratio of 3:1, the infrared spectrum shows a strong absorption at 1750 cm.$^{-1}$ corresponding to the C=N bond and the mass spectrum shows a parent peak at m/e=228 which gave a molecular weight by effusion of 231 (Th. 228).

EXAMPLE 3

Perfluoro(3-methyl-2,5-diazahexa-1,5-diene), $$CF_2=N-CF_2-CF(CF_3)-N=CF_2$$

(I) (0.1 g.) and fluorotrichloromethane, $CFCl_3$ (0.5 g.) is sealed together in an N.M.R. tube. The material is found to isomerize slowly and after sixteen days yields perfluoro(3-methyl-2,5-diazahexa-1,4-diene), $$CF_3-N=CF-CF(CF_3)-N=CF_2$$

(II), and perfluoro(3-methyl-2,5-diazahexa-2,4-diene), $$CF_3-N=CF-C(CF_3)=N-CF_3$$

(III) in the ratio of about 5:1. When this material is allowed to stand over cesium fluoride it isomerizes completely to (III) within thirty minutes. (II) and (III) are identified by their infrared mass and $F^{19}$ N.M.R. spectra together with molecular weights.

(II) Infrared, 1802, 1770 cm.$^{-1}$ corresponding to $$-N=CF- \text{ and } CF_2=N-$$

$F^{19}$ N.M.R. indicates six different types of fluorine atom in the ratio 3:3:1:1:1:1 and four of the peaks are each accompanied by a smaller peak corresponding to the geometric isomer, mass spectrum shows a parent ion at m/e=278 the molecular weight of which is found to be 278 by effusion.

(III) Infrared 1770, 1712 cm.$^{-1}$ corresponding to $$-N=CF- \text{ and } -N=C(CF_3)-$$

$F^{19}$ N.M.R. shows four different types of fluorine atoms in the ratio 3:3:3:1, each peak being accompanied by a smaller one corresponding to the geometric isomer. The mass spectrum shows a parent ion at m/e=278.

EXAMPLE 4

Perfluoro(3,4-dimethyl-2,5-diazahexa-1,5-diene), $$CF_2=N-CF(CF_3)-CF(CF_3)-N=CF_2$$

(0.1 g.) and $CFCl_3$ is condensed into an N.M.R. specimen tube, containing cesium fluoride (0.1 g.), which is then sealed. After 12 hours at ambient temperatures the material has isomerized to yield perfluoro(3,4-dimethyl-2,5-diazahexa-2,4-diene), $$CF_3-N=C(CF_3)-C(CF_3)=N-CF_3$$

which is identified by its $F^{19}$ N.M.R. and mass spectra. $F^{19}$ N.M.R. shows two different types of fluorine at the ratio 1:1. The yield is 65%.

EXAMPLE 5

Perfluoro-2,5-diazahexa-2,4-diene (0.1 g.) is condensed into a flask together with water (2 cc.). After standing for 1 day, white needles are obtained which are identified by infrared spectrum as N,N'-bis(trifluoromethyl)oxamide, $CF_3NHCOCONHCF_3$.

EXAMPLE 6

A sample of perfluoro α,ω-bisazomethine of the general Formula $CF_2=N-(CF_2)_{n+2}-N=CF_2$ is prepared by photolyzing a mixture of tetrafluoro-2,3-diazabuta-1,3-diene (1 part) and tetrafluoroethylene (10 parts) in a silica ampoule. The solid product is then dissolved in chlorotrifluoromethane and transferred to a flask containing dried cesium fluoride. The terminal azomethine group is shown by infrared spectral measurements, to have isomerized producing an N-trifluoromethyl terminated compound of the structure $CF_3-N=CF(CF_2)_nCF=N-CF_3$.

EXAMPLE 7

The procedure of Example 6 is repeated using the compound prepared from tetrafluoro-2,3-diazabuta-1,3-diene and chlorotrifluoroethylene. A compound which possesses the general formula $$CF_2=N-(CF_2CFCl)_{m+1}-N=CF_2$$

where m is as defined above is obtained.

The product obtained in this case is identified as having the structure $CF_3-N=CF(CF_2CFCl)_mCF=N-CF_3$, where m is as defined above by infrared spectral measurements.

I claim:
1. A compound having the formula

$$CF_3-N=CX-CY=N-CF_3$$

where X and Y are each fluorine or a lower perfluoroalkyl group.

2. A compound having the formula
$$CF_3-N=CF-CFX-N=CF_2$$
where X is fluorine or a lower perfluoroalkyl group.

3. A compound having the formula
$$CF_3-N=CF(CF_2)_nCF=N-CF_3$$
where n is an integer of from zero to 20, inclusive.

4. A compound having the formula
$$CF_3-N=CF(CF_2CFCl)_mCF=N-CF_3$$
where m is an integer from zero through 10, inclusive 5. Perfluoro-2,5-diazahexa-2,4-diene.
6. Perfluoro(3-methyl-2,5-diazahexa-2,4-diene).
7. Perfluoro(3-methyl-2,5-diazahexa-1,4-diene).
8. Perfluoro(3,4-dimethyl-2,5-diazahexa-2,4-diene).
9. Perfluoro(2,5-diazahexa-1,4-diene).

10. A process for the preparation of fluorinated diazadienes which comprises contacting under anhydrous conditions a fluorinated α,ω-bis(azomethino) alkylene with alkali metal fluordie as a source of fluoride ions at a temperature ranging from about 0 to 150° C., said alkylene being selected from the group consisting of:

| | |
|---|---|
| $CF_2=N-CF_2-N=CF_2$, | (I) |
| $CF_2=N-CFXCFY-N=CF_2$, | (II) |
| $CF_2=N-(CF_2)_n-N=CF_2$, and | (III) |
| $CF_2=N-(CF_2CFCl)_m-N=CF_2$, | (IV) | where X and Y are each fluorine or a lower perfluoroalkyl group, n is an integer from 0 to 20, and m is an integer from 0 to 10.

11. The process of claim 10 wherein said alkylene is selected from the group consisting of said Compounds II, III and IV, and said source of fluoride ions is cesium fluoride.

12. The process of claim 10 wherein said source of fluoride ion is cesium fluoride.

13. The process of claim 10 wherein said contacting is done in the presence of an inert-organic solvent.

14. The process of claim 13 wherein the solvent is chlorotrifluoromethane.

(References on following page)

References Cited

UNITED STATES PATENTS

| | | | |
|---|---|---|---|
| 3,152,131 | 10/1964 | Heberling | 260—288 |
| 3,320,309 | 5/1967 | Schlack et al. | 260—551 |

OTHER REFERENCES

Yale, J. Med. and Pharm. Chem., vol. 1 (2), pp. 121–33 (1959).

Chambers et al., J. Am. Chem. Soc., vol. 84, pp. 2337–43 (1962).

Monagle et al., J. Am. Chem. Soc., vol. 84, pp. 4288–95 (1962).

Russian Chem. Rev., vol. 31, No. 3, p. 216 (March 1965).

Banks, "J. Chem. Soc.," pp. 7207 and 7209 (1965).

Barr, "J. Chem. Soc.," pp. 2532 and 2533 (1965).

Markarov et al., "Chem. Abst.," vol. 57, col. 4528 (d), (1962).

Bacharov, "Russ. Chem. Revs.," vol. 34 (3), p. 216 (1965).

LEON ZITVER, Primary Examiner

G. A. SCHWARTZ, Assistant Examiner

U.S. Cl. X.R.

260—78 SC, 91.3 VA

UNITED STATES PATENT OFFICE
CERTIFICATE OF CORRECTION

Patent No. 3,660,511      Dated May 2, 1972

Inventor(s) PAUL H. OGDEN

It is certified that error appears in the above-identified patent and that said Letters Patent are hereby corrected as shown below:

Column 2, Line 33, should read (1)    $CF_3-N=C=N-CF_3$

Column 3, Line 34, the formula at the end of the line should read $$CF_3-N=CX-CY=N-CF_3$$

Column 5, Line 3, "$C_3F_6N_2:F$" should read $C_3F_6N_2$ F

Signed and sealed this 29th day of August 1972.

(SEAL)
Attest:

EDWARD M. FLETCHER, JR.          ROBERT GOTTSCHALK
Attesting Officer                 Commissioner of Patents